US009769722B2

United States Patent
Yu et al.

(10) Patent No.: US 9,769,722 B2
(45) Date of Patent: Sep. 19, 2017

(54) MULTIMODE TERMINAL INFORMATION PROCESSING METHOD, MULTIMODE TERMINAL AND ACCESS NETWORK DEVICE

(71) Applicant: ZTE Corporation, Shenzhen (CN)

(72) Inventors: Yuanfang Yu, Shenzhen (CN); Ting Lu, Shenzhen (CN); Xiaowu Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 113 days.

(21) Appl. No.: 14/389,029

(22) PCT Filed: Apr. 1, 2013

(86) PCT No.: PCT/CN2013/073546
§ 371 (c)(1),
(2) Date: Sep. 29, 2014

(87) PCT Pub. No.: WO2013/149568
PCT Pub. Date: Oct. 10, 2013

(65) Prior Publication Data
US 2015/0063297 A1   Mar. 5, 2015

(30) Foreign Application Priority Data

Apr. 6, 2012  (CN) .......................... 2012 1 0098777
Jun. 8, 2012  (CN) .......................... 2012 1 0188710
Jan. 15, 2013  (CN) .......................... 2013 1 0013755

(51) Int. Cl.
*H04W 36/14*   (2009.01)
*H04W 88/06*   (2009.01)
(Continued)

(52) U.S. Cl.
CPC .......... *H04W 36/14* (2013.01); *H04W 48/18* (2013.01); *H04W 76/045* (2013.01); *H04W 88/06* (2013.01)

(58) Field of Classification Search
None
See application file for complete search history.

(56) References Cited

U.S. PATENT DOCUMENTS

2010/0093350 A1* 4/2010 Wang .................. H04J 11/0093
455/436
2010/0128608 A1* 5/2010 Zou ....................... H04W 36/06
370/237
(Continued)

FOREIGN PATENT DOCUMENTS

CN      1607852 A    4/2005
CN    102143560 A    8/2011
(Continued)

OTHER PUBLICATIONS

Japanese Office Action dated Aug. 19, 2015, of Japanese Application No. 2015-503736/.
(Continued)

*Primary Examiner* — Duc Duong
(74) *Attorney, Agent, or Firm* — Banner & Witcoff, Ltd.

(57) ABSTRACT

Disclosed are an information processing method of a multimode terminal, a multimode terminal and an access network device, wherein, a multimode terminal negotiates with an HRPD access network to determine to close a session keep-alive message initiated by the HRPD access network, the HRPD access network does not transmit a session keep-alive request message to said terminal after said terminal is switched to an LTE network from an HRPD network; and/or after negotiating to determine to close a session keep-alive message initiated by said terminal, said terminal does not transmit a session keep-alive request
(Continued)

message to the HRPD network after being switched to the LTE network from the HRPD network. Said terminal acquires a dedicated priority of the HRPD and/or the LTE network from the HRPD access network, and performs network reselection in an idle state according to the dedicated priority when meeting an enabled condition of the dedicated priority.

8 Claims, 8 Drawing Sheets

(51) Int. Cl.
*H04W 48/18* (2009.01)
*H04W 76/04* (2009.01)

(56) References Cited

U.S. PATENT DOCUMENTS

| | | | | |
|---|---|---|---|---|
| 2010/0278142 A1* | 11/2010 | Dwyer | ............ | H04W 36/0083 370/331 |
| 2011/0034169 A1* | 2/2011 | Roberts | ............ | H04W 36/0055 455/435.3 |
| 2011/0201338 A1* | 8/2011 | Zou | ............ | H04W 36/0061 455/436 |
| 2012/0122458 A1* | 5/2012 | Jokinen | ............ | H04W 36/0061 455/437 |
| 2013/0189987 A1* | 7/2013 | Klingenbrunn | ..... | H04W 36/165 455/436 |
| 2013/0260765 A1* | 10/2013 | Aoyagi | ............ | H04W 36/0022 455/436 |
| 2014/0092867 A1* | 4/2014 | Yu | ............ | H04W 36/0066 370/331 |
| 2016/0286453 A1* | 9/2016 | Roberts | ............ | H04W 48/18 |

FOREIGN PATENT DOCUMENTS

| | | |
|---|---|---|
| CN | 102197684 A | 9/2011 |
| JP | 2010502144 A | 1/2010 |
| WO | 2010098264 A1 | 9/2010 |

OTHER PUBLICATIONS

International Search Report of PCT/CN2013/073546, dated Jun. 13, 2013.

* cited by examiner

MULTIMODE TERMINAL INFORMATION PROCESSING METHOD, MULTIMODE TERMINAL AND ACCESS NETWORK DEVICE

TECHNICAL FIELD

The present document relates to the field of communications, and in particular, to an information processing method of a multimode terminal, a multimode terminal and an access network device.

BACKGROUND OF THE RELATED ART

During the continuous evolution of the Code Division Multiple Access (CDMA) networks, interoperability with the Long Term Evolution (LTE) network is a development trend of the networks. A commercial CDMA network is evolved to the LTE network, which is not a simple substitution process, and instead, there will be a long coexistence period therebetween, during which interconnection and interworking between the two wireless networks are indispensable.

One of the evolved High Rate Packet Data (HRPD)-LTE interoperability functions is to support an idle switch of an access terminal from the HRPD to the LTE. In order to support that function, a series of protocol processes are defined in the HRPD system. However, there are still two problems needed to be considered:

Firstly, after the terminal is switched to the LTE network in an idle state, the HRPD access network and the terminal will continue to maintain air interface session information of the terminal in the HRPD network through a session maintenance timer, since the HRPD air interface session negotiation is time-consuming, and continuously maintaining the air interface session information for a period of time can avoid influencing the switch performance and the user experience due to the air interface session negotiation after the terminal switches back to the HRPD quickly. In the process of maintenance of the HRPD air interface session, the terminal and the HRPD access network can transmit a session keep-alive message to the counterpart respectively and wait for a response message from the counterpart. However, in the case that the terminal has been attached to the LTE network and there is no tunnel interface between the HRPD access network and a Mobility Management Entity (MME) of the LTE, the HRPD access network will still transmit the air interface session maintenance message to the terminal due to failing to know that it has been switched to the LTE network in an idle state, which will result in a waste of a paging channel capacity of the HRPD network, thereby influencing the HRPD network performance.

Secondly, the priority based idle reselection method makes the terminal always tend to a network with a high priority. According to the current idle reselection method, if a common priority is broadcast in an HRPD overhead message, the terminal will always perform reselection according to the common priority, which is commonly used by the terminal. While in general, the operator will set the priority of the LTE network to be higher than that of the HRPD network, and thus all terminals in an idle sate will always tend to the LTE network. Due to a long-term coexistence between the LTE network and the HRPD network, the operators desire to control the selection of a network to which the terminal in an idle state is attached according to a certain strategy, thereby implementing an equilibrium distribution of users and effective operation of networks, thus a condition that one network has a heavy network load and the other network is vacant is avoided.

SUMMARY

The embodiments of the present document provide an information processing method of a multimode terminal, a multimode terminal and an access network device, which solve a problem of communication barrier between the HRPD access network and a multimode terminal and a problem of disequilibrium of network selection after the terminal switches from the HRPD to the LTE in an idle state.

The embodiments of the present document provide an information processing method of a multimode terminal, comprising: a multimode terminal negotiating with a High Rate Packet Data (HRPD) access network to determine to close a session keep-alive message initiated by the HRPD access network, and the HRPD access network not transmitting a session keep-alive request message to the multimode terminal after the multimode terminal is switched to a Long Term Evolution (LTE) network from an HRPD network; and/or the multimode terminal negotiating with the HRPD access network to determine to close a session keep-alive message initiated by the multimode terminal, and the multimode terminal not transmitting a session keep-alive request message to the HRPD network after the multimode terminal is switched to the LTE network from the HRPD network.

The embodiments of the present document further provide another information processing method of a multimode terminal, comprising: a multimode terminal acquiring a dedicated priority of a High Rate Packet Data (HRPD) network and/or a Long Term Evolution (LTE) network from the HRPD access network, and performing network reselection in an idle state according to the dedicated priority when an enabled condition of the dedicated priority is met.

The above method may further comprise the following features:

the multimode terminal acquiring the dedicated priority from the HRPD access network comprises: the multimode terminal negotiating with the HRPD access network to determine the dedicated priority, or the HRPD access network assigning the dedicated priority for the multimode terminal.

The above method may further comprise the following features:

a manner of judging whether the enabled condition of the dedicated priority is met comprises: after receiving a dedicated priority activation indication transmitted by the HRPD access network, the multimode terminal determining that the enabled condition of the dedicated priority is met.

The above method may further comprise the following features:

the manner of judging whether the enabled condition of the dedicated priority is met comprises: after receiving a dedicated priority threshold transmitted by the HRPD access network, the multimode terminal determining that the enabled condition of the dedicated priority is met.

The above method may further comprise the following features:

the multimode terminal performing network reselection in an idle state according to the dedicated priority comprises: after judging that the dedicated priority is greater than or equal to the dedicated priority threshold transmitted by the HARD access network, the multimode terminal performing the network reselection in an idle state.

The above method may further comprise the following features:

a trigger condition that the HRPD access network transmits the dedicated priority activation indication is that a total load or a load increment or a load increase speed of the network exceeds a preset threshold, or the HRPD access network does not provide a public priority, or the HRPD access network judges that the multimode terminal is a multimode terminal supporting the dedicated priority.

The above method may further comprise the following features:

if the trigger condition that the HRPD access network transmits the priority threshold is that a total load or a load increment or a load increase speed of the network exceeds a preset threshold of a different level, the HRPD access network provides a dedicated priority threshold of a corresponding level.

The above method may further comprise the following features:

the manner of judging whether the enabled condition of the dedicated priority is met comprises: after receiving network load information transmitted by the HRPD access network, the multimode terminal judging whether the enabled condition of the dedicated priority is met according to the load information.

The above method may further comprise the following features:

the manner of judging whether the enabled condition of the dedicated priority is met comprises: after receiving random reselection probability information transmitted by the HRPD access network, the multimode terminal determining that the enabled condition of the dedicated priority is met.

The above method may further comprise the following features:

the manner of judging whether the enabled condition of the dedicated priority is met comprises: after receiving at least two of the following information transmitted by the HRPD access network: a dedicated priority activation indication, a dedicated priority threshold, and random reselection probability information, the multimode terminal determining that the enabled condition of the dedicated priority is met.

The above method may further comprise the following features:

when the information received by the multimode terminal from the HRPD access network comprises the random reselection probability information, a manner of the multimode terminal performing network reselection in an idle state according to the dedicated priority comprises: after judging that a condition of reselecting to the LTE indicated by the random reselection probability information is met according to the random reselection probability information, performing network reselection in an idle state.

The above method may further comprise the following features:

the random reselection probability information comprises at least one of a dedicated priority based random reselection probability and an LTE frequency based random reselection probability; wherein, the dedicated probability based random reselection probability represents a probability of reselecting to the LTE of each dedicated priority, and the LTE frequency based random reselection probability represents a probability that a terminal reselects to a different LTE frequency;

a condition of reselecting to the LTE indicated by the random reselection probability information comprises one or a combination of the following conditions: a condition of reselecting to the LTE indicated by the dedicated priority based random reselection probability is met and a condition of reselecting to the LTE and/or LTE frequency indicated by the LTE frequency based random reselection probability is met.

The above method may further comprise the following features:

when the information received by the multimode terminal from the HRPD access network comprises at least one of a dedicated priority activation indication, a dedicated priority threshold, random reselection probability information; the manner of the multimode terminal performing network reselection in an idle state according to the dedicated priority comprises: the multimode terminal performing network reselection in an idle state after performing operating steps corresponding to the received information in the following operating steps: identifying activation of the dedicated priority according to the dedicated priority activation indication, judging that the dedicated priority is greater than or equal to the dedicated priority threshold, and judging that a condition of reselecting to the LTE indicated by the random reselection probability information is met according to the random reselection probability information.

The embodiments of the present document provide a multimode terminal, comprising a dedicated priority acquisition module and a network reselection module, wherein, the dedicated priority acquisition module is configured to acquire a dedicated priority of a High Rate Packet Data (HRPD) network and/or a Long Term Evolution (LTE) network from the HRPD access network, and the network reselection module is configured to perform network reselection in an idle state according to the dedicated priority when an enabled condition of the dedicated priority is met.

The above multimode terminal may further comprise the following features:

the dedicated priority acquisition module is further configured to negotiate with the HRPD access network to determine the dedicated priority or receive the dedicated priority assigned by the HRPD access network for the multimode terminal from the HRPD access network.

The above multimode terminal may further comprise the following features:

the network reselection module is further configured to determine that the enabled condition of the dedicated priority is met after receiving a dedicated priority activation indication transmitted by the HRPD access network.

The above multimode terminal may further comprise the following features:

the network reselection module is further configured to determine that the enabled condition of the dedicated priority is met after receiving a dedicated priority threshold transmitted by the HRPD access network.

The above multimode terminal may further comprise the following features:

the network reselection module is further configured to perform the network reselection in an idle state after judging that the dedicated priority is greater than or equal to the dedicated priority threshold transmitted by the HARD access network.

The above multimode terminal may further comprise the following features:

the network reselection module is further configured to judge whether the enabled condition of the dedicated priority is met according to load information after receiving the network load information transmitted by the HRPD access network.

The above multimode terminal may further comprise the following features:

the network reselection module is further configured to determine that the enabled condition of the dedicated priority is met after receiving random reselection probability information transmitted by the HRPD access network.

The above multimode terminal may further comprise the following features:

the network reselection module is further configured to determine that the enabled condition of the dedicated priority is met after receiving at least two of the following information transmitted by the HRPD access network: a dedicated priority activation indication, a dedicated priority threshold, and random reselection probability information.

The above multimode terminal may further comprise the following features:

the network reselection module is further configured to perform network reselection in an idle state after judging that a condition of reselecting to the LTE indicated by the random reselection probability information is met according to the random reselection probability information when the information received from the HRPD access network comprises the random reselection probability information.

The above multimode terminal may further comprise the following features:

a condition of reselecting to the LTE indicated by the random reselection probability information comprises one or a combination of the following conditions: a condition of reselecting to the LTE indicated by the dedicated priority based random reselection probability is met and a condition of reselecting to the LTE and/or LTE frequency indicated by the LTE frequency based random reselection probability is met; and the random reselection probability information comprises at least one of a dedicated priority based random reselection probability and an LTE frequency based random reselection probability; wherein, the dedicated probability based random reselection probability represents a probability of reselecting to the LTE of each dedicated priority, and the LTE frequency based random reselection probability represents a probability that a terminal reselects to a different LTE frequency.

The above multimode terminal may further comprise the following features:

the network reselection module is configured as that when the information received from the HRPD access network comprises at least one of a dedicated priority activation indication, a dedicated priority threshold, random reselection probability information; a manner of the multimode terminal performing network reselection in an idle state according to the dedicated priority comprises: performing network reselection in an idle state after performing operating steps corresponding to the received information in the following operating steps: identifying activation of the dedicated priority according to the dedicated priority activation indication, judging that the dedicated priority is greater than or equal to the dedicated priority threshold, and judging that a condition of reselecting to the LTE indicated by the random reselection probability information is met according to the random reselection probability information.

The embodiments of the present document provide a High Rate Packet Data (HRPD) access network device, comprising a network dedicated priority configuration module; wherein, the network dedicated priority configuration module is configured to configure a dedicated priority of an HRPD network and/or a Long Term Evolution (LTE).

The above HRPD access network device may further comprise the following features:

the network dedicated priority configuration module is further configured to transmit a dedicated priority activation indication to a multimode terminal after a total load or a load increment or a load increase speed of the network exceeds a preset threshold, or is further configured to transmit network load information for judging that an enabled condition of the dedicated priority is met to the multimode terminal.

The above HRPD access network device may further comprise the following features:

the network dedicated priority configuration module is further configured to transmit a dedicated priority activation indication to a multimode terminal when the HRPD access network does not provide a public priority; or is further configured to transmit the dedicated priority activation indication to a terminal capable of supporting the dedicated priority.

The above HRPD access network device may further comprise the following features:

the network dedicated priority configuration module is further configured to transmit a dedicated priority threshold of a corresponding different level to a multimode terminal when a total load or a load increment or a load increase speed of the network exceeds a preset threshold of a different level.

The above HRPD access network device may further comprise the following features:

the network dedicated priority configuration module is further configured to transmit the random reselection probability information to a multimode terminal; wherein, the random reselection probability information comprises at least one of a dedicated priority based random reselection probability and an LTE frequency based random reselection probability; wherein, the dedicated probability based random reselection probability represents a probability of reselecting to the LTE of each dedicated priority, and the LTE frequency based random reselection probability represents a probability that a terminal reselects to a different LTE frequency; wherein, a condition of the network dedicated priority configuration module transmitting the random reselection probability information to the multimode terminal comprises at least one of a total load of the HRPD and/or LTE network, or a load increment of the HRPD and/or LTE network or a load increase speed of the HRPD and/or LTE network exceeding a preset threshold of a different level.

The present scheme can solve a problem of communication barrier between the HRPD access network and a multimode terminal and a problem of disequilibrium of network selection after the terminal switches from the HRPD to the LTE in an idle state.

DETAILED DESCRIPTION

The embodiments of the present document will be described in further detail hereinafter in conjunction with accompanying drawings. It should be illustrated that without conflict, the embodiments of the present application and the features in the embodiments can be combined with each other randomly.

Scheme One

Figure 1:
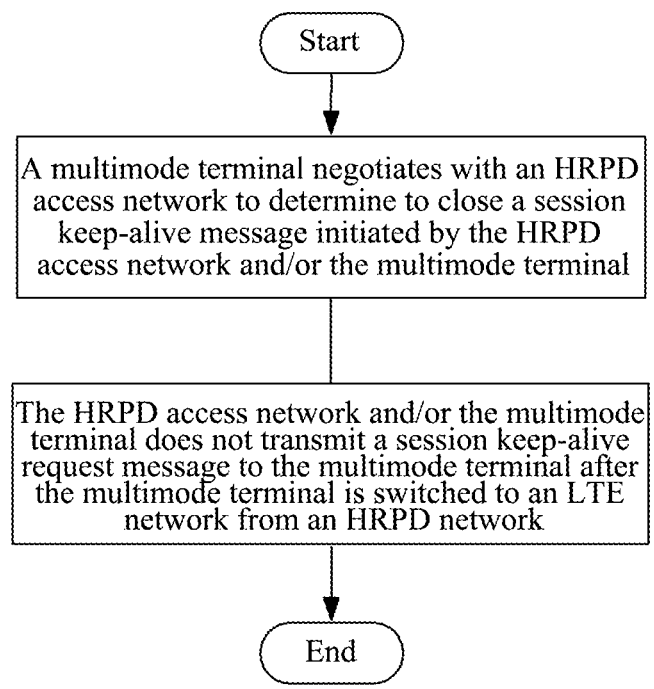
FIG. 1 is a diagram of an information processing method in scheme one.

As shown in FIG. 1, an information processing method of a multimode terminal comprises:

a multimode terminal negotiating with a High Rate Packet Data (HRPD) access network to determine to close a session keep-alive message initiated by the HRPD access network, and the HRPD access network not transmitting a session keep-alive request message to the multimode terminal after the multimode terminal is switched to a Long Term Evolution (LTE) network from an HRPD network; and/or the multimode terminal negotiating with the HRPD access network to determine to close a session keep-alive message initiated by the multimode terminal, and the multimode terminal not transmitting a session keep-alive request message to the HRPD network after the multimode terminal is switched to the LTE network from the HRPD network.

Compared to transmitting a session keep-alive request message in the related art, not transmitting the session keep-alive request message in the present scheme can be implemented by multiple modes, such as various modes of enabling the session keep-alive request message not to be transmitted, for example, setting an operation of prohibiting transmitting the session keep-alive request message, canceling an execution step of transmitting a session keep-alive request message, deleting the execution step of transmitting the session keep-alive request message etc.

Specific Embodiment One

Figure 2:
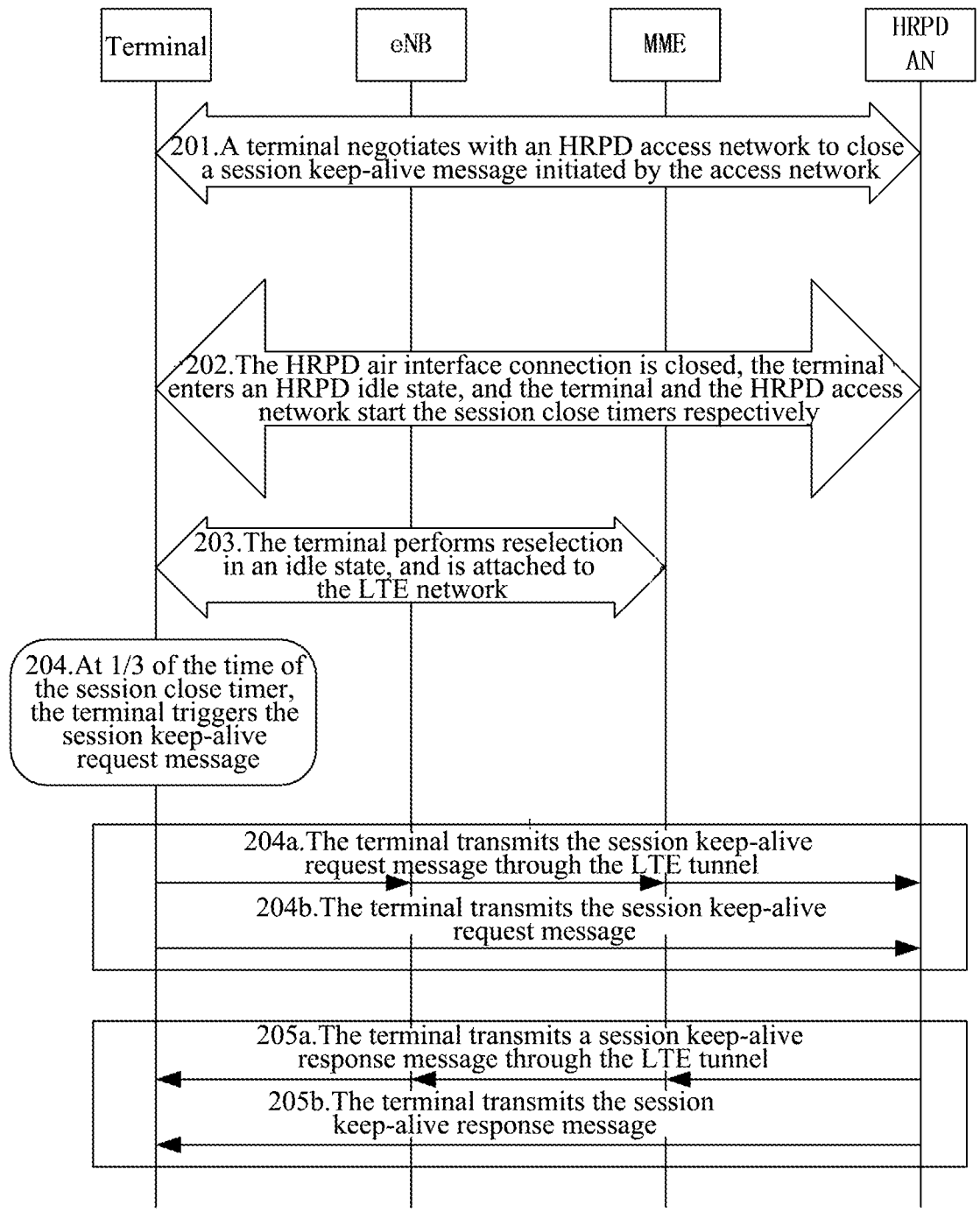
FIG. 2 is a diagram of a method according to specific embodiment one.

As shown in FIG. 2, the specific embodiment one comprises the following steps.

In step 201, a terminal negotiates with an HRPD access network to close a session keep-alive message initiated by the access network;

after the step 201 is performed, in the subsequent steps, the HRPD access network does not transmit a session keep-alive request message to the multimode terminal;

in step 202, the HRPD air interface connection is closed, the terminal enters an HRPD idle state, and the terminal and the HRPD access network start the session close timers respectively;

in step 203, the terminal performs reselection among different systems in an idle state, and is attached to the LTE network;

in step 204, at ⅓ of the time of the session close timer, the terminal triggers the session keep-alive request message;

in step 204a, if there is a tunnel interface between the MME and the HRPD access network, the terminal will transmit the session keep-alive request message through the LTE tunnel;

in step 204b, if there is no tunnel interface between the MME and the HRPD access network, the terminal will transmit the session keep-alive request message through the HRPD air interface;

in step 205a, if there is a tunnel interface between the MME and the HRPD access network, the HRPD access network will transmit a session keep-alive response message through the LTE tunnel;

in step 205b, if there is no tunnel interface between the MME and the HRPD access network, the HRPD access network will transmit the session keep-alive response message through the HRPD air interface.

Specific Embodiment Two

Figure 3:
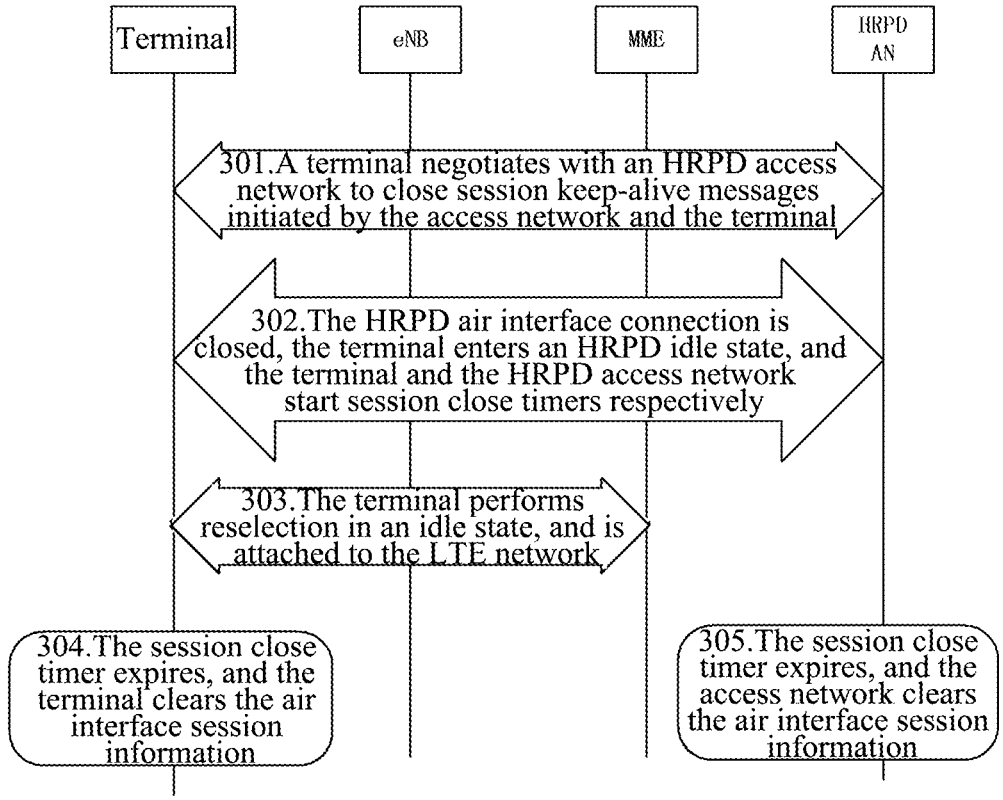
FIG. 3 is a diagram of a method according to specific embodiment two.

As shown in FIG. 3, the specific embodiment two comprises the following steps.

In step 301, a terminal negotiates with an HRPD access network to close session keep-alive messages initiated by the access network and the terminal;

after the step 301 is performed, in the subsequent steps, the HRPD access network does not transmit a session keep-alive request message to the multimode terminal; and the multimode terminal does not transmit the session keep-alive request message to the HRPD network;

in step 302, the HRPD air interface connection is closed, the terminal enters an HRPD idle state, and the terminal and the HRPD access network start session close timers respectively;

in step 303, the terminal performs reselection among different systems in an idle state, and is attached to the LTE network;

in step 304, the session close timer of the terminal expires, and the terminal clears the HRPD air interface session information;

In step 305, the session close timer of the HRPD access network expires, and the HRPD access network clears the HRPD air interface session information.

Scheme Two

Figure 4:
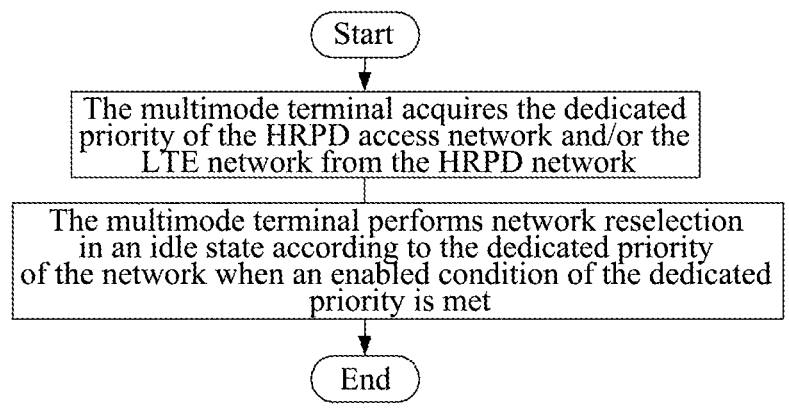
FIG. 4 is a diagram of an information processing method in scheme two.

As shown in FIG. 4, an information processing method of a multimode terminal comprises: a multimode terminal acquiring a dedicated priority of a HRPD network and/or a LTE network from the HRPD access network, and performing network reselection in an idle state according to the dedicated priority when an enabled condition of the dedicated priority is met.

The manner of the multimode terminal acquiring the dedicated priority from the HRPD access network comprises the multimode terminal negotiating with the HRPD access network to determine the dedicated priority or the HRPD access network assigning the dedicated priority for the multimode terminal. The dedicated priority herein generally refers to the terminal information with the dedicated priority attribute.

The manner of judging whether an enabled condition of the dedicated priority is met comprises: after receiving a dedicated priority activation indication transmitted by the HRPD access network, the multimode terminal determining that the enabled condition of the dedicated priority is met. A trigger condition that the HRPD access network transmits the dedicated priority activation indication is that a total load or a load increment or a load increase speed of the network exceeds a preset threshold, or the HRPD access network does not provide a public priority, or the HRPD access network judges that the multimode terminal is a multimode terminal supporting the dedicated priority.

The manner of judging whether an enabled condition of the dedicated priority is met may further comprise: after receiving a dedicated priority threshold transmitted by the HRPD access network, the multimode terminal determining that the enabled condition of the dedicated priority is met. The trigger condition that the HRPD access network transmits the priority threshold is that a total load or a load increment or a load increase speed of the network exceeds a preset threshold of a different level, then the HRPD access network provides a dedicated priority threshold of a corresponding level. The multimode terminal performing network reselection in an idle state according to the dedicated priority comprises: after judging that the dedicated priority is greater than or equal to the dedicated priority threshold transmitted by the HARD access network, the multimode terminal performing the network reselection in an idle state.

The manner of judging whether an enabled condition of the dedicated priority is met may further comprise: after receiving network load information transmitted by the HRPD access network, the multimode terminal judging whether the enabled condition of the dedicated priority is met according to the load information.

The manner of judging whether an enabled condition of the dedicated priority is met may further comprise: after receiving random reselection probability information transmitted by the HRPD access network, the multimode terminal determining that the enabled condition of the dedicated priority is met.

The manner of judging whether an enabled condition of the dedicated priority is met may further comprise: after receiving at least two of the following information transmitted by the HRPD access network: a dedicated priority activation indication, a dedicated priority threshold, and random reselection probability information, the multimode terminal determining that the enabled condition of the dedicated priority is met.

Wherein, the random reselection probability information comprises one or a combination of a dedicated priority based random reselection probability and an LTE frequency based random reselection probability; wherein, the dedicated probability based random reselection probability represents a probability of reselecting to the LTE of each dedicated priority, and the LTE frequency based random reselection probability represents a probability that a terminal reselects to a different LTE frequency. A condition of reselecting to the LTE indicated by the random reselection probability information comprises one or a combination of the following conditions: a condition of reselecting to the LTE indicated by the dedicated priority based random reselection probability is met and a condition of reselecting to the LTE and/or LTE frequency indicated by the LTE frequency based random reselection probability is met.

A condition of triggering the HRPD access network to transmit the random reselection probability information to the multimode terminal comprises at least one of a total load of the HRPD and/or LTE network, or a load increment of the HRPD and/or LTE network or a load increase speed of the HRPD and/or LTE network exceeding a preset threshold of a different level.

When the information received by the multimode terminal from the HRPD access network comprises the random reselection probability information, the manner of the multimode terminal performing network reselection in an idle state according to the dedicated priority comprises: after judging that a condition of reselecting to the LTE indicated by the random reselection probability information is met according to the random reselection probability information, performing network reselection in an idle state.

When the information received by the multimode terminal from the HRPD access network comprises at least one of a dedicated priority activation indication, a dedicated priority threshold, random reselection probability information; the manner of the multimode terminal performing network reselection in an idle state according to the dedicated priority comprises: the multimode terminal performing network reselection in an idle state after performing operating steps corresponding to the received information in the following operating steps: identifying activation of the dedicated priority according to the dedicated priority activation indication, judging that the dedicated priority is greater than or equal to the dedicated priority threshold, and judging that a condition of reselecting to the LTE indicated by the random reselection probability information is met according to the random reselection probability information. Specifically, the multimode terminal performing network reselection in an idle state according to the dedicated priority comprises: after receiving the dedicated priority activation indication, the multimode terminal needing to perform network reselection in an idle state after the step of identifying activation of the dedicated priority according to the dedicated priority activation indication; after receiving the dedicated priority threshold, the multimode terminal needing to perform network reselection in an idle state after the step of judging that the dedicated priority is greater than or equal to the dedicated priority threshold transmitted by the HRPD access network; and after receiving the random reselection probability information, the multimode terminal needing to perform network reselection in an idle state after the step of judging that a condition of reselecting to the LTE indicated by the random reselection probability information is met according to the random reselection probability information.

Figure 5:
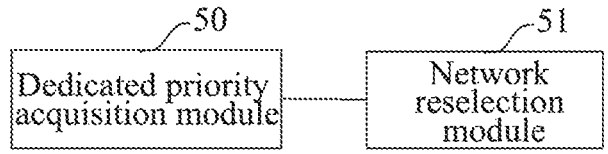
FIG. 5 is a structural diagram of a multimode terminal in the scheme two.

As shown in FIG. 5, in the scheme two, a multimode terminal comprises a dedicated priority acquisition module 50 and a network reselection module 51.

The dedicated priority acquisition module 50 is configured to acquire a dedicated priority of a High Rate Packet Data (HRPD) network and/or a Long Term Evolution (LTE) network from the HRPD access network, and the network reselection module 51 is configured to perform network reselection in an idle state according to the dedicated priority when an enabled condition of the dedicated priority is met.

the dedicated priority acquisition module 50 is further configured to negotiate with the HRPD access network to determine the dedicated priority or receive the dedicated priority assigned by the HRPD access network for the multimode terminal from the HRPD access network.

The network reselection module 51 is further configured to determine that the enabled condition of the dedicated priority is met after receiving a dedicated priority activation indication transmitted by the HRPD access network.

The network reselection module 51 is further configured to determine that the enabled condition of the dedicated priority is met after receiving a dedicated priority threshold transmitted by the HRPD access network.

The network reselection module 51 is further configured to perform the network reselection in an idle state after judging that the dedicated priority is greater than or equal to the dedicated priority threshold transmitted by the HARD access network.

The network reselection module 51 is further configured to judge whether the enabled condition of the dedicated priority is met according to the load information after receiving network load information transmitted by the HRPD access network.

The network reselection module 51 is further configured to determine that the dedicated priority based network reselection condition is met after receiving random reselection probability information transmitted by the HRPD access network.

The network reselection module 51 is further configured to determine that the enabled condition of the dedicated priority is met after receiving at least two of the following information transmitted by the HRPD access network: a dedicated priority activation indication, a dedicated priority threshold, and random reselection probability information.

The network reselection module 51 is further configured to perform network reselection in an idle state after judging that a condition of reselecting to the LTE indicated by the random reselection probability information is met according to the random reselection probability information when the information received from the HRPD access network comprises the random reselection probability information.

Wherein, a condition of reselecting to the LTE indicated by the random reselection probability information comprises one or a combination of the following conditions: a condition of reselecting to the LTE indicated by the dedicated priority based random reselection probability is met by the terminal and a condition of reselecting to the LTE and/or LTE frequency indicated by the LTE frequency based random reselection probability is met by the terminal. The random reselection probability information comprises at least one of a dedicated priority based random reselection probability and an LTE frequency based random reselection probability; wherein, the dedicated probability based random reselection probability represents a probability of reselecting to the LTE of each dedicated priority, and the LTE frequency based random reselection probability represents a probability that a terminal reselects to a different LTE frequency.

The network reselection module is configured as that when the information received from the HRPD access network comprises at least one of a dedicated priority activation indication, a dedicated priority threshold, random reselection probability information; the manner of the multimode terminal performing network reselection in an idle state according to the dedicated priority comprises: performing network reselection in an idle state after performing operating steps corresponding to the received information in the following operating steps: identifying activation of the dedicated priority according to the dedicated priority activation indication, judging that the dedicated priority is greater than or equal to the dedicated priority threshold, and judging that a condition of reselecting to the LTE indicated by the random reselection probability information is met according to the random reselection probability information.

Figure 6:
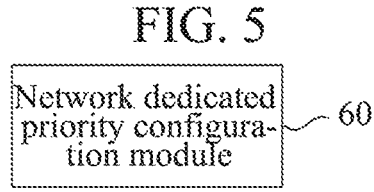
FIG. 6 is a structural diagram of a high-speed packet data access network device in the scheme two.

As shown in FIG. 6, in the scheme, a HRPD access network device comprises a network dedicated priority configuration module 60.

The network dedicated priority configuration module 60 is configured to configure a dedicated priority of a High Rate Packet Data (HRPD) network and/or a Long Term Evolution (LTE).

The network dedicated priority configuration module 60 is further configured to transmit a dedicated priority activation indication and/or a dedicated priority threshold (here, the dedicated priority threshold is a dedicated priority threshold with a level corresponding to the preset threshold) to a multimode terminal after a total load or a load increment or a load increase speed of the network exceeds a preset threshold (may comprise a preset threshold of a different level), or is further configured to transmit network load information for judging that an enabled condition of the dedicated priority is met to the multimode terminal, or transmit a dedicated priority activation indication to a multimode terminal when the HRPD access network does not provide a public priority; or is further configured to transmit the dedicated priority activation indication to a terminal capable of supporting the dedicated priority.

The network dedicated priority configuration module 60 is further configured to transmit a dedicated priority activation indication to a multimode terminal when the HRPD access network does not provide a public priority; or is further configured to transmit the dedicated priority activation indication to a terminal capable of supporting the dedicated priority.

The network dedicated priority configuration module 60 is further configured to transmit the random reselection probability information to a multimode terminal; wherein, the random reselection probability information comprises at least one of a dedicated priority based random reselection probability and an LTE frequency based random reselection probability; wherein, the dedicated probability based random reselection probability represents a probability of reselecting to the LTE of each dedicated priority, and the LTE frequency based random reselection probability represents a probability that a terminal reselects to a different LTE frequency. Wherein, a condition of the network dedicated priority configuration module transmitting the random reselection probability information to the multimode terminal comprises at least one of a total load of the HRPD and/or LTE network, a load increment of the HRPD and/or LTE network, a load increase speed of the HRPD and/or LTE network exceeding a preset threshold of a different level.

Specific Embodiment Three

Figure 7:
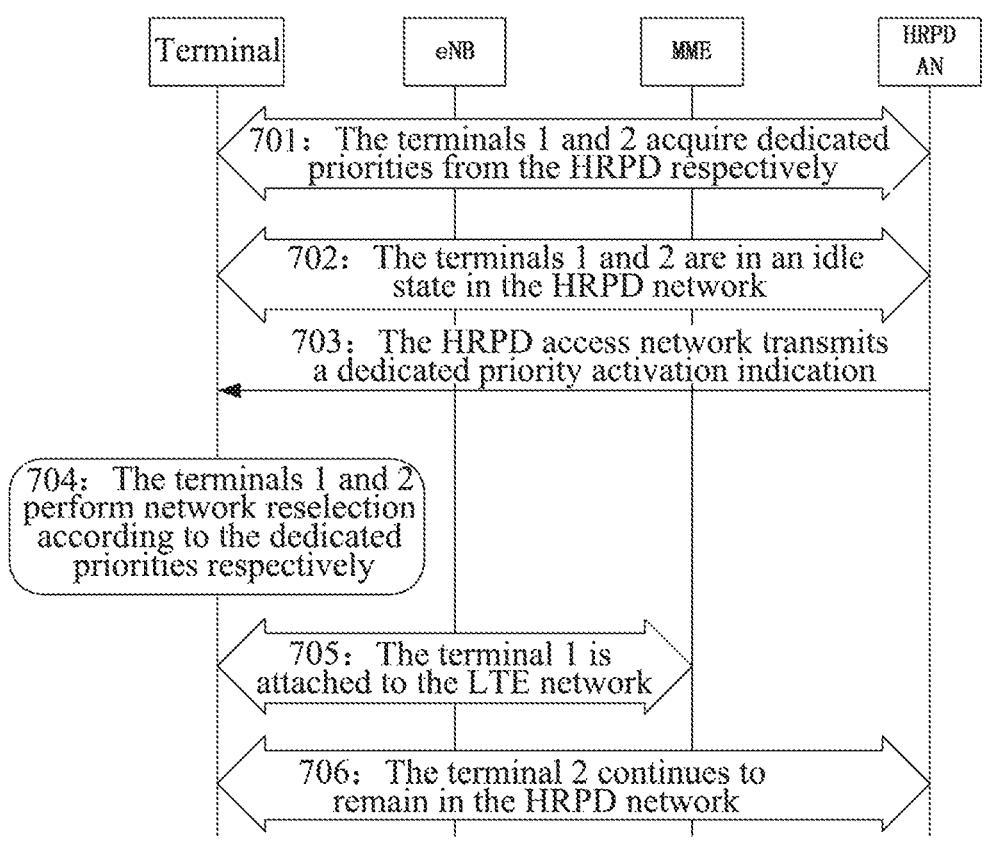
FIG. 7 is a diagram of a method according to specific embodiment three.

As shown in FIG. 7, the specific embodiment three comprises the following steps 701 to 706.

In step 701, terminal 1 and terminal 2 acquire dedicated priorities among different systems from an HRPD network respectively. The specific manner comprises: the terminal 1 and the terminal 2 negotiating with the HRPD access network to determine dedicated priority information respectively, or the HRPD access network assigning the dedicated priority information for the terminal 1 and the terminal 2 respectively, for example, the HRPD access network may bring the dedicated priority to the terminal through messages such as a session negotiation message (configuration request/response message, attribute update request/acceptance message), a connection release message or a channel assignment message etc; wherein, the HRPD access network may decide the dedicated priority of the terminal through subscription data of the terminal and/or according to the operator strategy, and the dedicated priority is primarily used for cell selection or reselection among different systems, or may also be referred to as a dedicated cell selection or reselection priority among different systems.

In step 702, the terminal 1 and the terminal 2 are in an idle state in the HRPD network.

In step 703, the HRPD access network transmits a dedicated priority activation indication among different systems to the terminal.

The HRPD access network may set the indication information according to a load condition of the network thereof and/or a different network. For example, when a total load or a load increment or a load increase speed of a certain network exceeds a preset threshold, the dedicated priority is activated.

Or the HRPD access network directly transmits load information among different systems to the terminal, or the multimode terminal judges whether the enabled condition of the dedicated priority is met according to the load information. For example, the load information comprises multiple load levels, and when the multimode terminal judges that one or more levels are met by a load of a certain network, the dedicated priority is activated automatically.

In addition, the HRPD access network may also flexibly set the activation indication of the dedicated priority. For example, when the HRPD access network does not provide a public priority, the HRPD access network may directly activate the dedicated priority (without considering the above load condition or other parameter conditions); or for a terminal capable of supporting the dedicated priority, the HRPD access network may always activate the dedicated priority thereof (without considering the above load condition or other parameter conditions).

In step 704, the terminal performs network reselection in an idle state according to the dedicated priority.

In step 705, the terminal 1 performs reselection and is attached to the LTE network.

In step 706, the terminal 2 continues to remain in the HRPD network.

Specific Embodiment Four

Figure 8:
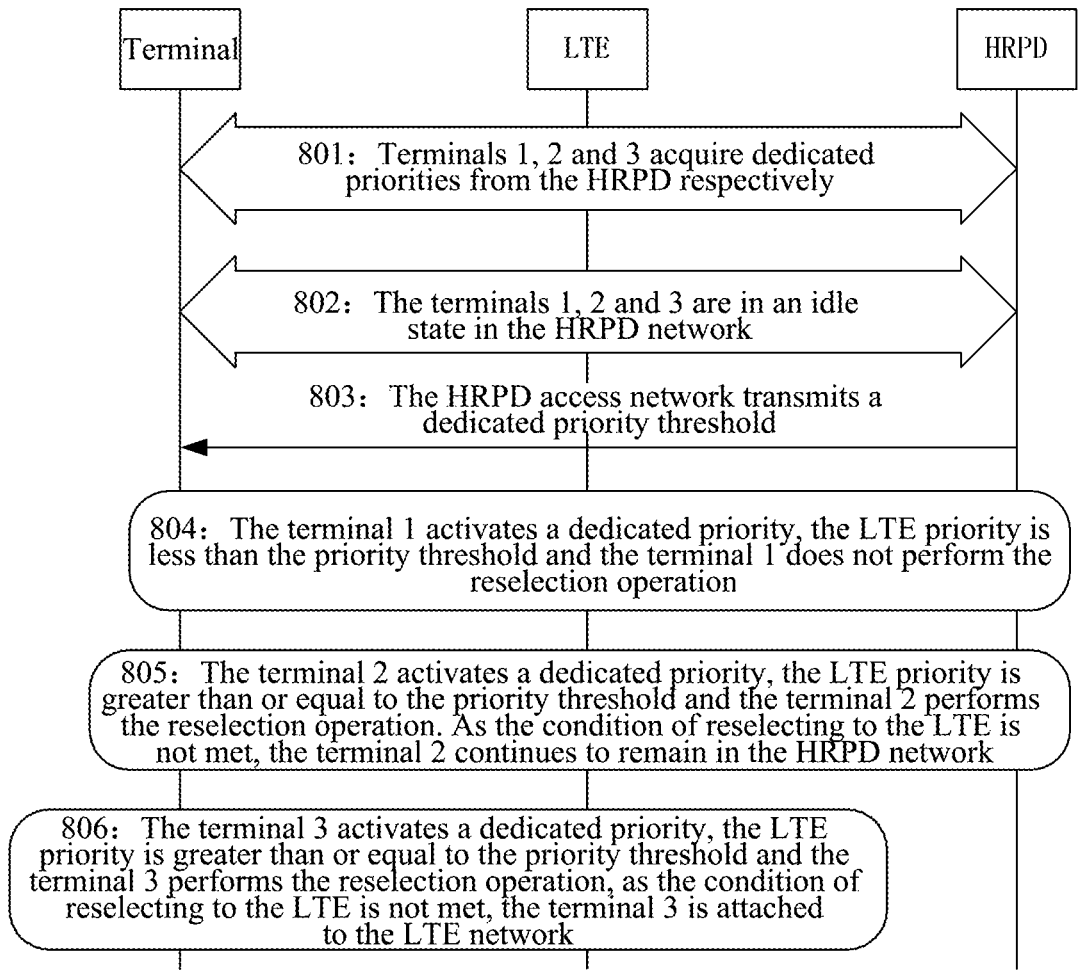
FIG. 8 is a diagram of a method relating to a priority threshold in specific embodiment four.

As shown in FIG. 8, the specific embodiment four comprises the following steps 801 to 806:

In step 801, terminals 1, 2 and 3 receive dedicated priorities among different systems from the HRPD network respectively. The specific manner comprises the terminals 1, 2 and 3 negotiating with the HRPD access network to determine dedicated priority information respectively, or the HRPD access network assigning the dedicated priority information for the terminals 1, 2 and 3 respectively, for example, the HRPD access network may assign the information through messages such as a session negotiation message (configuration request/response message, attribute update request/acceptance message), a connection release message or a channel assignment message etc; wherein, the HRPD access network may decide the dedicated priority of the terminal through subscription data of the terminal and/or according to the operator strategy, and the dedicated priority is primarily used for cell selection or reselection among different systems, or may also be referred to as a dedicated network or cell selection or reselection priority among different systems; or the HRPD access network brings the dedicated priority to the terminal through an Over-the-air Parameter Administration (OTAPA) mode.

In step 802, the terminals 1, 2 and 3 are in an idle state in the HRPD network.

In step 803, the HRPD access network transmits a dedicated priority threshold among different systems to the terminal. After receiving the dedicated priority threshold among different systems (the terminal is in the HRPD network, and therefore, the dedicated priority threshold among different systems here refers to the LTE dedicated priority threshold), the terminal activates the LTE dedicated priority thereof and judges whether the network selection or reselection based on the dedicated priority among different systems can be performed.

The HRPD access network may set the threshold information according to a load condition of the network thereof and/or a different network. For example, when a total load or a load increment or a load increase speed of a certain network exceeds a preset threshold of a different level, the dedicated priority threshold of a corresponding level is set. For example, the dedicated priority is divided into 7 levels, and thresholds of the 7 levels and dedicated priority thresholds of corresponding 7 levels may be set.

In step 804, the terminal 1 judges that the LTE dedicated priority thereof is less than the dedicated priority threshold, and the terminal 1 does not perform the reselection operation and continues to remain in the HRPD network.

In step 805, the terminal 2 judges that the LTE dedicated priority thereof is greater than or equal to the dedicated priority threshold, and performs the reselection operation. As a condition of reselecting to the LTE is not met (for example, the LTE priority is less than the HRPD priority and the LTE signal quality does not meet the signal quality and/or intensity condition of reselection, or the LTE priority is greater than the HRPD priority and the LTE signal quality does not meet the signal quality and/or intensity condition of reselection etc., and the specific contents may be known with reference to the definition of the specification), the terminal 2 continues to remain in the HRPD network.

In step 806, the terminal 3 judges that the LTE dedicated priority thereof is greater than or equal to the dedicated priority threshold, then performs the reselection operation. As a condition of reselecting to the LTE is met (for example, the LTE priority is less than the HRPD priority and the LTE signal quality meets the signal quality and/or intensity condition of reselection, or the LTE priority is greater than the HRPD priority and the LTE signal quality meets the signal quality and/or intensity condition of reselection etc., and the specific contents may be known with reference to the definition of the specification), the terminal 3 is attached to the LTE network.

Specific Embodiment Five

Figure 9:
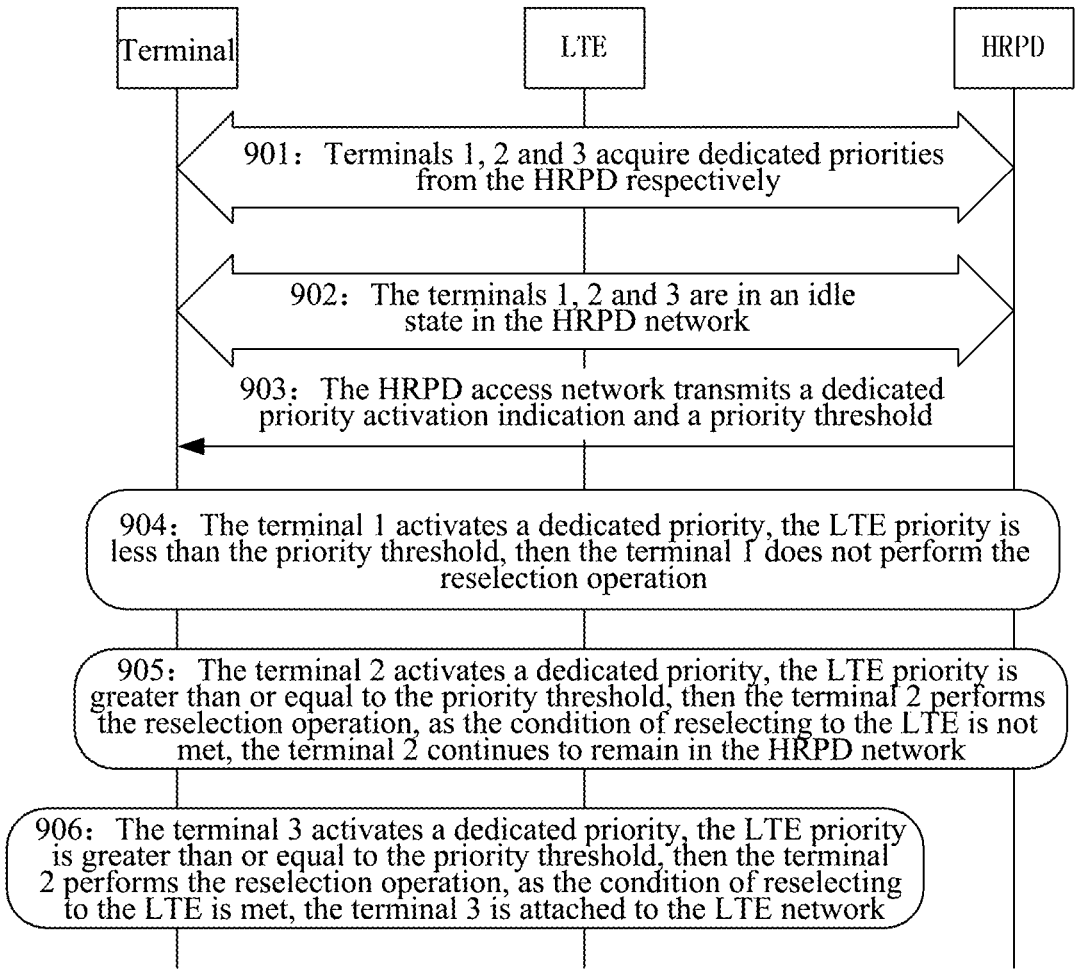
FIG. 9 is a diagram of a method relating to a dedicated priority activation indication and a priority threshold in specific embodiment five.

As shown in FIG. 9, the specific embodiment five comprises the following steps:

In step 901, terminals 1, 2 and 3 receive dedicated priorities among different systems from the HRPD network respectively. The specific manner comprises the terminals 1, 2 and 3 negotiating with the HRPD access network to determine dedicated priority information respectively, or the HRPD access network assigning the dedicated priority information for the terminals 1, 2 and 3 respectively, for example, the HRPD access network may bring the dedicated priority to the terminal through messages such as a session negotiation message (configuration request/response message, attribute update request/acceptance message), a connection release message or a channel assignment message etc; wherein, the HRPD access network may decide the dedicated priority of the terminal through subscription data of the terminal and/or according to the operator strategy, and the dedicated priority is primarily used for cell selection or reselection among different systems, or may also be referred to as a dedicated network or cell selection or reselection priority among different systems; or the HRPD access network brings the dedicated priority to the terminal through an Over-the-air Parameter Administration (OTAPA) mode.

In step 902, the terminals 1, 2 and 3 are in an idle state in the HRPD network.

In step 903, the HRPD access network transmits a dedicated priority activation indication among different systems and a dedicated priority threshold among different systems to the terminal. After receiving the dedicated priority activation indication, the terminal activates its LTE dedicated priority. Further, the dedicated priority threshold among different systems (the terminal is in the HRPD network, and therefore, the dedicated priority threshold among different systems here refers to the LTE dedicated priority threshold) is used by the terminal to judge whether the network selection or reselection based on the dedicated priority among different systems can be performed.

The HRPD access network may set the activation indication and the threshold information according to a load condition of the network thereof and/or a different network. For example, when a total load or a load increment or a load increase speed of a certain network exceeds a preset threshold of a different level, the dedicated priority threshold of a corresponding level is set. For example, the dedicated priority is divided into 7 levels, and thresholds of the 7 levels and dedicated priority thresholds of corresponding 7 levels may be set.

In step 904, the terminal 1 judges that the LTE dedicated priority thereof is less than the dedicated priority threshold, then the terminal 1 does not perform the reselection operation and continues to remain in the HRPD network.

In step 905, the terminal 2 judges that the LTE dedicated priority thereof is greater than or equal to the dedicated priority threshold, then performs the reselection operation. As a condition of reselecting to the LTE is not met (for example, the LTE priority is less than the HRPD priority and the LTE signal quality does not meet the signal quality and/or intensity condition of reselection, or the LTE priority is greater than the HRPD priority and the LTE signal quality does not meet the signal quality and/or intensity condition of reselection etc., and the specific contents may be known with reference to the definition of the specification), the terminal 2 continues to remain in the HRPD network.

In step 906, the terminal 3 judges that the LTE dedicated priority thereof is greater than or equal to the dedicated priority threshold, then performs the reselection operation. As a condition of reselecting to the LTE is met (for example, the LTE priority is less than the HRPD priority and the LTE signal quality meets the signal quality and/or intensity condition of reselection, or the LTE priority is greater than the HRPD priority and the LTE signal quality meets the signal quality and/or intensity condition of reselection etc., and the specific contents may be known with reference to the definition of the specification), the terminal 3 is attached to the LTE network.

Specific Embodiment Six

Figure 10:
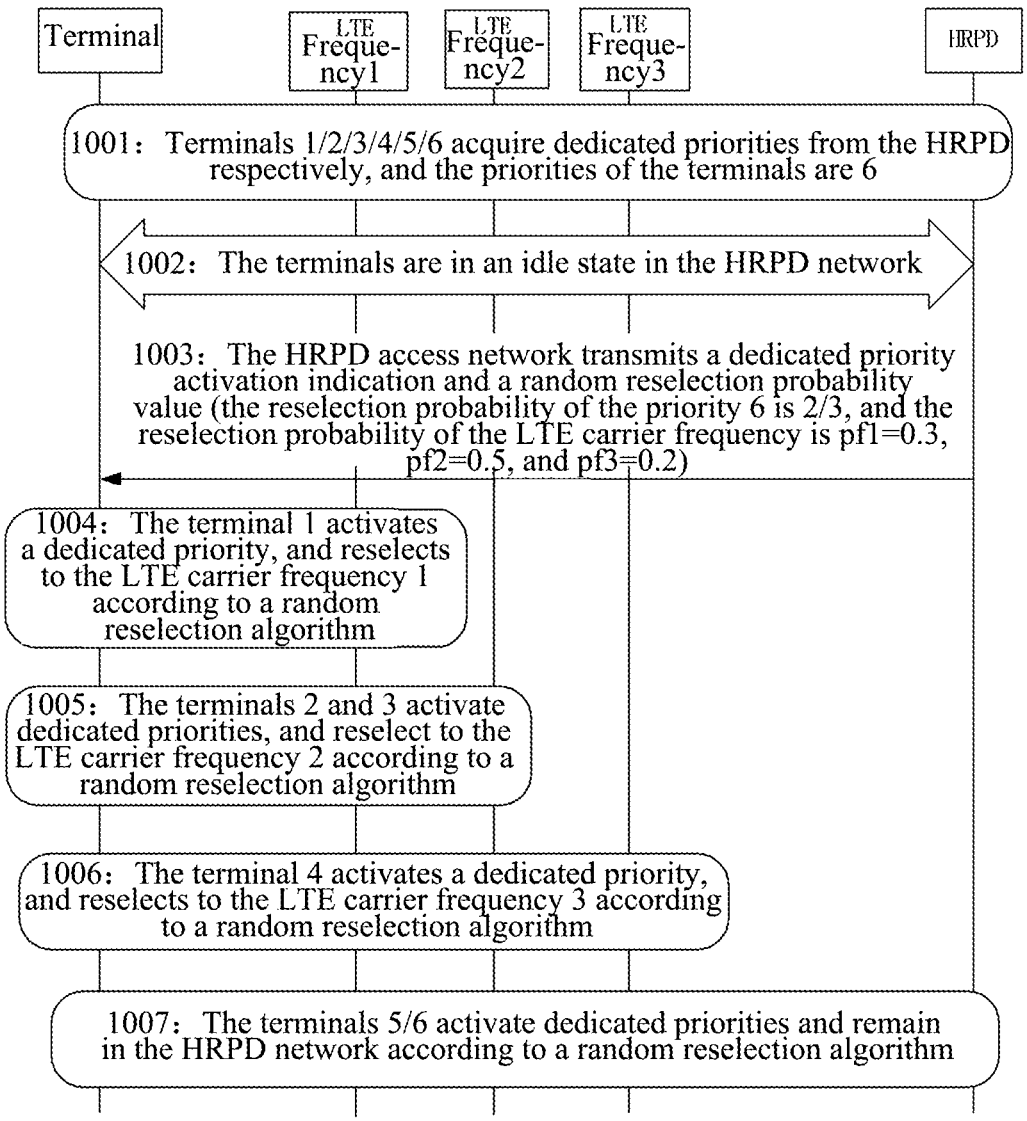
FIG. 10 is a diagram of a method based on random reselection related in specific embodiment six.

As shown in FIG. 10, the specific embodiment six comprises the following steps:

In step 1001, terminals 1, 2, 3, 4, 5 and 6 receive dedicated priorities among different systems from the HRPD network respectively. In the present embodiment, assume that the dedicated priorities of the terminals 1-6 are 6. The specific manner comprises the terminals 1, 2, 3, 4, 5 and 6 negotiating with the HRPD access network to determine dedicated priority information respectively, or the HRPD access network assigning the dedicated priority information for the terminals 1, 2, 3, 4, 5 and 6 respectively, for example, the HRPD access network may bring the dedicated priority to the terminal through messages such as a session negotiation message (configuration request/response message, attribute update request/acceptance message), a connection release message or a channel assignment message etc; wherein, the HRPD access network may decide the dedicated priority of the terminal through subscription data of the terminal and/or according to the operator strategy, and the dedicated priority is primarily used for network or cell selection or reselection among different systems, or may also be referred to as a dedicated network or cell selection or reselection priority among different systems; or the HRPD access network brings the dedicated priority to the terminal through an Over-the-air Parameter Administration (OTAPA) mode.

In step 1002, the terminals 1, 2, 3, 4, 5 and 6 are in an idle state in the HRPD network.

In step 1003, the HRPD access network transmits a dedicated priority activation indication among different systems and random reselection probability information to the terminal. After receiving the dedicated priority activation indication, the terminal activates the LTE dedicated priority thereof. Further, the terminal determines whether to reselect to the LTE and the frequency of the reselected target LTE according to the reselection probability.

The HRPD access network may set the activation indication according to a load condition of the network thereof and/or a different network, for example, when a total load or a load increment or a load increase speed of a certain network exceeds a preset threshold.

The HRPD access network may set the random reselection probability information according to a load condition of the network thereof and/or a different network and a dedicated priority level (the HRPD access network may directly give a corresponding random reselection probability value or the HPRD access network gives random reselection probability information, and the terminal calculates the random reselection probability value corresponding to the random reselection probability information according to the corresponding algorithm). The random reselection probability information comprises two parts. The first part is dedicated priority based random reselection probability information, and a corresponding reselection probability value is denoted as $p\_p$ (in the embodiment, assuming that $p\_p$ of the dedicated priority 6 is equal to ⅔, for example, when a value of the dedicated priority based random reselection probability information transmitted by the HRPD access network and received by the terminal is 0, it represents that the dedicated priority based random reselection probability $p\_p$ is 100%, and when the value of the dedicated priority based random reselection probability information is 1, it represents that the dedicated priority based random reselection probability $p\_p$ is ⅔). The HRPD access network may allocate the probability of reselecting to the LTE to each dedicated priority, and in general, the higher the priority is, the higher the probability is. The second part is LTE frequency based random reselection probability information, and a corresponding reselection probability value is denoted as $p\_f$ (in the embodiment, assuming that the probabilities of the LTE frequencies 1, 2, 3 are $p\_f1=0.3$, $p\_f2=0.5$ and $p\_f3=0.2$ respectively, for example, when the values of the random reselection probability information based on the corresponding frequencies 1, 2, and 3 which are transmitted by the HRPD access network and received by the terminal are 3, 5, and 2 respectively, it represents that the random reselection probabilities based on the frequencies 1, 2 and 3 are $3/(3+5+2)=0.3$, $5/(3+5+2)=0.5$ and $2/(3+5+2)=0.2$ respectively). The HRPD access network may allocate the probability that the terminal may reselect to the frequency to each LTE frequency, and in general, the lower the load is, the higher the probability is.

The specific random reselection algorithm is (assume that the LTE and HRPD signal intensities are good enough):

the terminal generates a random number x within [0,1]; if x<=p_p, i.e., x<⅔, it represents that the terminal may reselect to the LTE, and if x>p_p, i.e., x>⅔, it represents that the terminal continues to remain in the HRPD;

when x<=p_p i.e., x<⅔, which LTE frequency to be reselected may further be determined according to the reselection probability of the LTE frequency, and may be determined with reference to the following algorithm (the algorithm is only an example, and the terminal may devise other algorithms according to the random reselection algorithm):

if x<=[p_p*p_f1=⅔*0.3=0.2], the terminal reselects to the LTE frequency 1;

if [p_p*p_f1=⅔*0.3=0.2]<x<=[p_p*(p_f1+p_f2)=⅔*(0.3+0.5)=0.53], the terminal reselects to the LTE frequency 2;

if [p_p*(p_f1+p_f2)=⅔*(0.3+0.5)=0.53]<x<=[p_p*(p_f1+p_f2+p_f3)=0.67], the terminal reselects to the LTE frequency 3.

In step 1004, the terminal 1 activates the dedicated priority and generates a random number 0.1 according to the random reselection algorithm of step 3, and if a condition of reselecting to the LTE indicated by the random reselection probability information is met, the reselection operation is performed. If a condition of reselecting to the LTE is met (for example, the LTE and/or HRPD signal meets the signal quality and/or intensity condition of the reselection etc., and the specific contents may be known with reference to the definition of the specification), the terminal 1 reselects to the LTE frequency 1.

In step 1005, the terminals 2 and 3 activate the dedicated priorities and generate random numbers 0.4 and 0.5 according to the random reselection algorithm of step 3, and if a condition of reselecting to the LTE indicated by the random reselection probability information is met, the reselection operation is performed. If a condition of reselecting to the LTE is met (for example, the LTE and/or HRPD signal meets the signal quality and/or intensity condition of the reselection etc., and the specific contents may be known with reference to the definition of the specification), the terminals 2 and 3 reselect to the LTE frequency 2.

In step 1006, the terminal 4 activates the dedicated priority and generates a random number 0.6 according to the random reselection algorithm of step 3, and if a condition of reselecting to the LTE indicated by the random reselection probability information is met, the reselection operation is performed. If a condition of reselecting to the LTE is met (for example, the LTE and/or HRPD signal meets the signal quality and/or intensity condition of the reselection etc., and the specific contents may be known with reference to the definition of the specification), the terminal 4 reselects to the LTE frequency 3.

In step 1007, the terminals 5 and 6 activate the dedicated priorities and generate random numbers 0.7 and 0.8 according to the random reselection algorithm of step 3, and a condition of reselecting to the LTE indicated by the random reselection probability information is not met, the terminals 5 and 6 remain in the HRPD.

Specific Embodiment Seven

Figure 11:
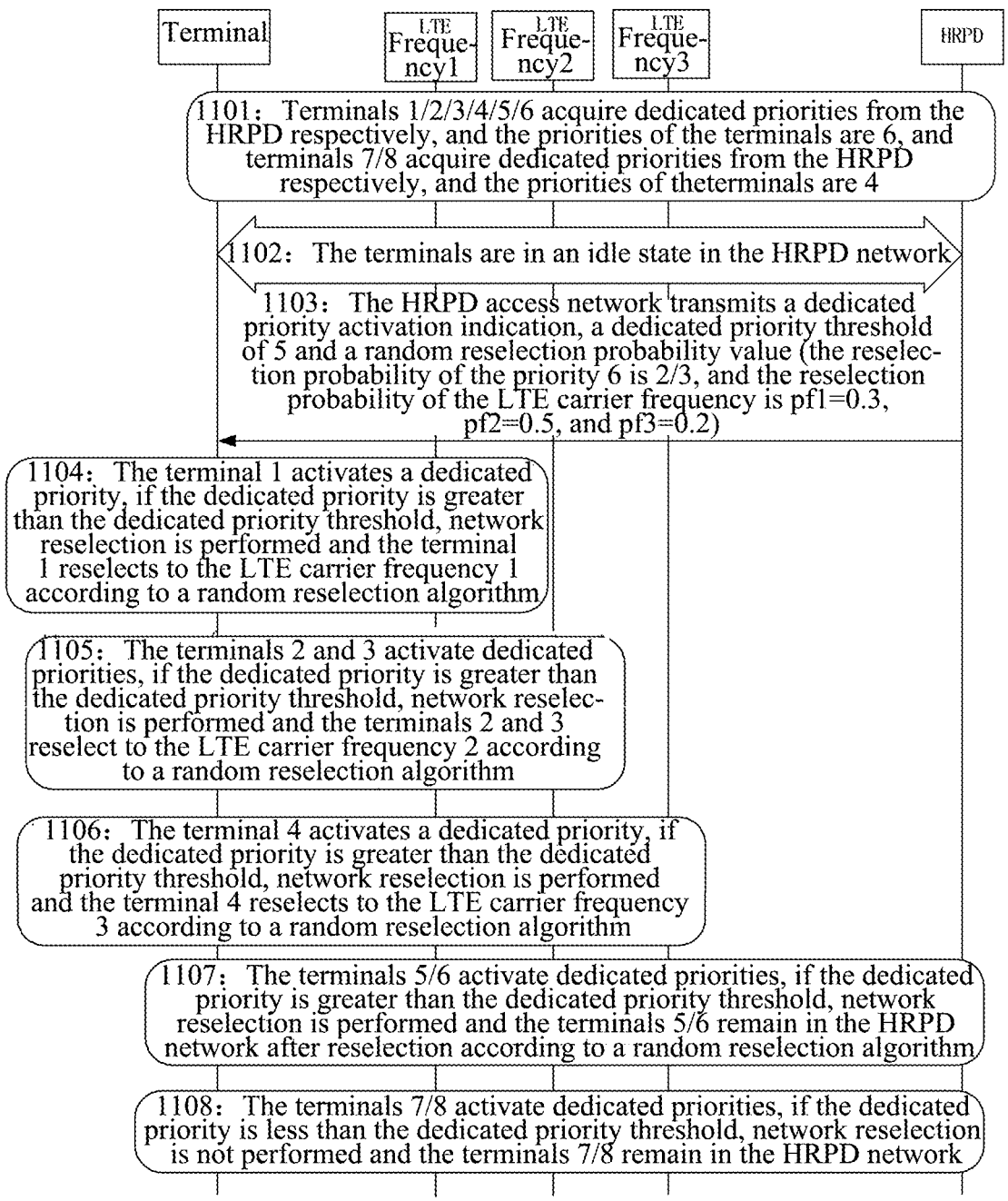
FIG. 11 is a diagram of a method based on random reselection related in specific embodiment seven.

As shown in FIG. 11, the specific embodiment seven comprises the following steps:

In step 1101, terminals 1, 2, 3, 4, 5, 6, 7 and 8 receive dedicated priorities among different systems from the HRPD network respectively. In the present embodiment, assume that the dedicated priorities of the terminals 1-6 are 6, and the dedicated priorities of the terminals 7 and 8 are 4. The specific manner comprises: the terminals negotiating with the HRPD access network to determine dedicated priority information respectively, or the HRPD access network assigning the dedicated priority information for the terminals respectively, for example, the HRPD access network may bring the dedicated priority to the terminal through messages such as a session negotiation message (configuration request/response message, attribute update request/acceptance message), a connection release message or a channel assignment message etc; wherein, the HRPD access network may decide the dedicated priority of the terminal through subscription data of the terminal and/or according to the operator strategy, and the dedicated priority is primarily used for network or cell selection or reselection among different systems, or may also be referred to as a dedicated network or cell selection or reselection priority among different systems; or the HRPD access network brings the dedicated priority to the terminal through an Over-the-air Parameter Administration (OTAPA) mode.

In step 1102, the terminals 1, 2, 3, 4, 5, 6, 7 and 8 are in an idle state in the HRPD network.

In step 1103, the HRPD access network transmits a dedicated priority activation indication among different systems, a dedicated priority threshold and random reselection probability information to the terminal. After receiving the dedicated priority activation indication, the terminal activates the LTE dedicated priority thereof. Further, the terminal determines whether to reselect to the LTE and the frequency of the reselected target LTE according to the dedicated priority threshold and reselection probability.

The HRPD access network may set the activation indication according to a load condition of the network thereof and/or a different network, for example, when a total load or a load increment or a load increase speed of a certain network exceeds a preset threshold.

The HRPD access network may set the dedicated priority threshold (in the embodiment, assume that the dedicated priority threshold is 5) and random reselection probability information according to a load condition of the network thereof and/or a different network and a dedicated priority level (the HRPD access network may directly give a corresponding random reselection probability value or the HPRD access network gives random reselection probability information, and the terminal calculates the random reselection probability value corresponding to the random reselection probability information according to the corresponding algorithm). The random reselection probability information comprises two parts. The first part is dedicated priority based random reselection probability information, and a corresponding reselection probability value is denoted as p_p (in the embodiment, assuming that p_p of the dedicated priority 6 is equal to ⅔, For example, when a value of the dedicated priority based random reselection probability information transmitted by the HRPD access network and received by the terminal is 0, it represents that the dedicated priority based random reselection probability p_p is 100%, and when the value of the dedicated priority based random reselection probability information is 1, it represents that the dedicated priority based random reselection probability p_p is ⅔). The HRPD access network may allocate the probability of reselecting to the LTE to each dedicated priority, and in general, the higher the priority is, the higher the probability is. The second part is LTE frequency based random reselection probability information, and a corresponding reselection probability value is denoted as p_f (in the embodiment, assuming that the probabilities of the LTE frequencies 1, 2, 3 are p_f1=0.3, p_f2=0.5 and p_f3=0.2, for example, when the values of the random reselection probability information based on the corresponding frequencies 1, 2, and 3 which are transmitted by the HRPD access network and received by the terminal are 3, 5, and 2 respectively, it represents that the random reselection probabilities based on the frequencies 1, 2 and 3 are 3/(3+5+2)=0.3, 5/(3+5+2)=0.5 and 2/(3+5+2)=0.2 respectively). The HRPD access network may allocate the probability that the terminal may reselect to the frequency to each LTE frequency, and in general, the lower the load is, the higher the probability is.

The specific random reselection algorithm is (assume that the LTE and HRPD signal intensities are good enough):

the terminal generates a random number x within [0,1]; if x<=p_p, i.e., x<⅔, it represents that the terminal may reselect to the LTE, and if x>p_p, i.e., x>⅔, it represents that the terminal continues to remain in the HRPD;

when x<=p_p i.e., x<⅔, which LTE frequency to be reselected may further be determined according to the reselection probability of the LTE frequency, and may be determined with reference to the following algorithm (the algorithm is only an example, and the terminal may devise other algorithms according to the random reselection algorithm):

if x<=[p_p*p_f1=⅔*0.3=0.2], the terminal reselects to the LTE frequency1;

if [p_p*p_f1=⅔*0.3=0.2]<x<=[p_p*(p_f1+p_f2)=⅔*(0.3+0.5)=0.53], the terminal reselects to the LTE frequency 2;

if [p_p*(p_f1+p_f2)=⅔*(0.3+0.5)=0.53]<x<=[p_p*(p_f1+p_f2+p_f3)=0.67], the terminal reselects to the LTE frequency 3.

In step 1104, the terminal 1 activates the dedicated priority, and the dedicated priority of the terminal 1 is 6, which is higher than priority threshold. The terminal 1 further generates a random number 0.1 according to the random reselection algorithm of step 3, and if a condition of reselecting to the LTE indicated by the random reselection probability information is met, the reselection operation is performed. If a condition of reselecting to the LTE is met (the LTE and/or signal meets the signal quality and/or intensity condition of the reselection etc., and the specific contents may be known with reference to the definition of the specification), the terminal 1 reselects to the LTE frequency 1.

In step 1105, the terminals 2 and 3 activate the dedicated priorities, and the dedicated priorities of the terminals 2 and 3 are 6, which is higher than priority threshold. The terminals 2 and 3 further generate random numbers 0.4 and 0.5 according to the random reselection algorithm of step 3, and if a condition of reselecting to the LTE indicated by the random reselection probability information is met, the reselection operation is performed. If a condition of reselecting to the LTE is met (the LTE and/or HRPD signal meets the signal quality and/or intensity condition of the reselection etc., and the specific contents may be known with reference to the definition of the specification), the terminals 2 and 3 reselect to the LTE frequency 2.

In step 1106, the terminal 4 activates the dedicated priority, and the dedicated priority of the terminal 4 is 6, which is higher than priority threshold. The terminal 4 further generates a random number 0.6 according to the random reselection algorithm of step 3, and if a condition of reselecting to the LTE indicated by the random reselection probability information is met, the reselection operation is performed. If a condition of reselecting to the LTE is met (the LTE and/or HRPD signal meets the signal quality and/or intensity condition of the reselection etc., and the specific contents may be known with reference to the definition of the specification), the terminal 1 reselects to the LTE frequency 3.

In step 1107, the terminals 5 and 6 activate the dedicated priorities, and the dedicated priorities of the terminals 5 and 6 are 6, which is higher than priority threshold. The terminals 5 and 6 further generate random numbers 0.7 and 0.8 according to the random reselection algorithm of step 3, and a condition of reselecting to the LTE indicated by the random reselection probability information is not met, the terminals 5 and 6 remain in the HRPD.

In step 1108, the terminals 7 and 8 activate the dedicated priorities, and the dedicated priorities of the terminals 7 and 8 are 4, which is lower than priority threshold. It represents that the terminals 7 and 8 remain in the HRPD.

In the above specific embodiments four, five, six and seven, the dedicated priority among different systems acquired by the terminal from the HRPD network may be a dedicated priority of another network (or system) different from the HRPD network except the LTE.

Of course, the present document can have a plurality of other embodiments. Without departing from the spirit and substance of the present document, those skilled in the art can make various corresponding changes and variations according to the present document, and all these corresponding changes and variations should belong to the protection scope of the appended claims in the present document.

A person having ordinary skill in the art can understand that all or part of steps in the above method can be implemented by programs instructing related hardware, and the programs can be stored in a computer readable storage medium, such as a read-only memory, disk or disc etc. Alternatively, all or part of steps in the above embodiments can also be implemented by one or more integrated circuits. Accordingly, each module/unit in the above embodiments can be implemented in a form of hardware, or can also be implemented in a form of software functional module. The present application is not limited to any particular form of a combination of hardware and software.

INDUSTRIAL APPLICABILITY

The present scheme can solve a problem of communication barrier between the HRPD access network and a multimode terminal and a problem of disequilibrium of network selection after the terminal switches from the HRPD to the LTE in an idle state.

What is claimed is:

1. An information processing method of a multimode terminal, comprising:
a multimode terminal acquiring a dedicated priority of a High Rate Packet Data (HRPD) access network and/or a Long Term Evolution (LTE) network from the HRPD access network, and performing network reselection in an idle state according to the dedicated priority when an enabled condition of the dedicated priority is met;
wherein the multimode terminal determines that the enabled condition of the dedicated priority is met after receiving random reselection probability information transmitted by the HRPD access network or after receiving at least two of the following information transmitted by the HRPD access network: a dedicated priority activation indication, a dedicated priority threshold, and random reselection probability information;

when the information received by the multimode terminal from the HRPD access network comprises the random reselection probability information, the multimode terminal performs network reselection in an idle state according to the dedicated priority by: after judging that a condition of reselecting to the LTE indicated by the random reselection probability information is met according to the random reselection probability information, performing network reselection in an idle state, wherein, the random reselection probability information comprises at least one of a dedicated priority based random reselection probability and an LTE frequency based random reselection probability;

wherein, the dedicated probability based random reselection probability represents a probability of reselecting to the LTE of each dedicated priority, and the LTE frequency based random reselection probability represents a probability that a terminal reselects to a different LTE frequency; and the condition of reselecting to the LTE indicated by the random reselection probability information comprises one or a combination of the following conditions: a condition of reselecting to the LTE indicated by the dedicated priority based random reselection probability is met and a condition of reselecting to the LTE and/or LTE frequency indicated by the LTE frequency based random reselection probability is met.

2. The method according to claim 1, wherein,
the multimode terminal acquiring the dedicated priority from the HRPD access network comprises: the multimode terminal negotiating with the HRPD access network to determine the dedicated priority, or the HRPD access network assigning the dedicated priority for the multimode terminal.

3. The method according to claim 1, further comprising:
after receiving a dedicated priority activation indication transmitted by the HRPD access network, the multimode terminal determining that the enabled condition of the dedicated priority is met,
or,
after receiving a dedicated priority threshold transmitted by the HRPD access network, the multimode terminal determining that the enabled condition of the dedicated priority is met.

4. The method according to claim 1, wherein,
when the information received by the multimode terminal from the HRPD access network comprises at least one of a dedicated priority activation indication, a dedicated priority threshold, random reselection probability information; a manner of the multimode terminal performing network reselection in an idle state according to the dedicated priority comprises: the multimode terminal performing network reselection in an idle state after performing operating steps corresponding to the received information in the following operating steps: identifying activation of the dedicated priority according to the dedicated priority activation indication, judging that the dedicated priority is greater than or equal to the dedicated priority threshold, and judging that a condition of reselecting to the LTE indicated by the random reselection probability information is met according to the random reselection probability information.

5. A multimode terminal, comprising a processor and a memory containing instructions that when executed by the processor make the processor:
acquire a dedicated priority of a High Rate Packet Data (HRPD) access network and/or a Long Term Evolution (LTE) network from the HRPD access network, and
perform network reselection in an idle state according to the dedicated priority when an enabled condition of the dedicated priority is met;
wherein the processor is further configured to:
determine that the enabled condition of the dedicated priority is met after receiving random reselection probability information transmitted by the HRPD access network, or after receiving at least two of the following information transmitted by the HRPD access network; a dedicated priority activation indication, a dedicated priority threshold, and random reselection probability information;
perform network reselection in an idle state after judging that the condition of reselecting to the LTE indicated by the random reselection probability information is met according to the random reselection probability information when the information received from the HRPD access network comprises the random reselection probability information;
wherein, a condition of reselecting to the LTE indicated by the random reselection probability information comprises one or a combination of the following conditions; a condition of reselecting to the LTE indicated by the dedicated priority based random reselection probability is met and a condition of reselection to the LTE and/or LTE frequency indicated by the LTE frequency based random reselection probability is met; and
the random reselection probability information comprises at least one of a dedicated priority based random reselection probability and an LTE frequency based random reselection probability; wherein, the dedicated probability based random reselection probability represents a probability of reselection to the LTE of each dedicated priority, and the LTE frequency based random reselection probability represents a probability that a terminal reselects to a different LTE frequency.

6. The multimode terminal according to claim 5, wherein,
the processor is further configured to negotiate with the HRPD access network to determine the dedicated priority, or receive the dedicated priority assigned by the HRPD access network for the multimode terminal from the HRPD access network.

7. The multimode terminal according to claim 5, wherein,
the processor is further configured to determine that the enabled condition of the dedicated priority is met after receiving a dedicated priority activation indication transmitted by the HRPD access network,
or,
wherein, the processor is further configured to determine that the enabled condition of the dedicated priority is met after receiving a dedicated priority threshold transmitted by the HRPD access network,
or,
wherein, the processor is further configured to perform the network reselection in an idle state after judging that the dedicated priority is greater than or equal to the dedicated priority threshold transmitted by the HRPD access network.

8. The multimode terminal according to claim 5, wherein,
the processor is configured such that when the information received from the HRPD access network comprises at least one of a dedicated priority activation indication, a dedicated priority threshold, random reselection probability information; a manner of the multimode terminal performing network reselection in an idle state according to the dedicated priority comprises: performing network reselection in an idle state after performing operating steps corresponding to the received information in the following operating steps: identifying activation of the dedicated priority according to the dedicated priority activation indication, judging that the dedicated priority is greater than or equal to the dedicated priority threshold, and judging that a condition of reselecting to the LTE indicated by the random reselection probability information is met according to the random reselection probability information.

* * * * *